United States Patent
Camelio et al.

(10) Patent No.: US 11,104,751 B2
(45) Date of Patent: Aug. 31, 2021

(54) BIARYL PHENOXY GROUP IV TRANSITION METAL CATALYSTS FOR OLEFIN POLYMERIZATION

(71) Applicant: Dow Global Technologies LLC, Midland, MI (US)

(72) Inventors: Andrew M. Camelio, Midland, MI (US); Endre Szuromi, Lake Jackson, TX (US); David D. Devore, Midland, MI (US); Robert D. J. Froese, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/624,564

(22) PCT Filed: Jun. 19, 2018

(86) PCT No.: PCT/US2018/038275
§ 371 (c)(1),
(2) Date: Dec. 19, 2019

(87) PCT Pub. No.: WO2018/236863
PCT Pub. Date: Dec. 27, 2018

(65) Prior Publication Data
US 2020/0131289 A1    Apr. 30, 2020

Related U.S. Application Data

(60) Provisional application No. 62/522,213, filed on Jun. 20, 2017.

(51) Int. Cl.
| | | |
|---|---|---|
| *C08F 4/76* | (2006.01) | |
| *C08F 4/64* | (2006.01) | |
| *C08F 210/16* | (2006.01) | |
| *C07F 7/28* | (2006.01) | |
| *C08F 4/659* | (2006.01) | |

(52) U.S. Cl.
CPC .............. *C08F 210/16* (2013.01); *C07F 7/28* (2013.01); *C08F 4/64058* (2013.01); *C08F 4/65908* (2013.01); *C08F 4/65912* (2013.01); *C08F 2420/05* (2013.01)

(58) Field of Classification Search
CPC .............. C08F 4/64508; C08F 4/60508; C08F 4/62508; C08F 4/64058; C08F 4/60058; C08F 4/62058
See application file for complete search history.

(56) References Cited

U.S. PATENT DOCUMENTS

| | | | |
|---|---|---|---|
| 2004/0214717 A1 | 10/2004 | Brummer et al. | |
| 2006/0052554 A1 | 3/2006 | Boussie et al. | |
| 2009/0286944 A1* | 11/2009 | Ackerman | C08F 12/08 526/147 |
| 2020/0157254 A1* | 5/2020 | Camelio | C08F 210/16 |
| 2020/0190228 A1* | 6/2020 | Szuromi | C08F 4/65912 |

FOREIGN PATENT DOCUMENTS

| | | |
|---|---|---|
| WO | 03091262 A1 | 11/2003 |
| WO | 2013013111 A1 | 1/2013 |
| WO | 2013036546 A2 | 3/2013 |
| WO | 2013052585 A2 | 4/2013 |

OTHER PUBLICATIONS

Lamberti et al., "Metal-catalysed Polymerisation", Dalton Transactions, 2009, 8831-8837.
International Search Report and Written Opinion pertaining to PCT/US2018/038275, dated Oct. 5, 2018.
Office Action dated Jan. 19, 2021 pertaining to U.S. Appl. No. 16/621,492, filed Dec. 11, 2019, 13 pgs.

* cited by examiner

*Primary Examiner* — Rip A Lee
(74) *Attorney, Agent, or Firm* — Dinsmore & Shohl LLP

(57) ABSTRACT

Embodiments are directed to catalyst systems comprising at least one metal ligand complex and to processes for polyolefin polymerization incorporating the catalyst systems. The metal ligand complexes have the following structures: (I)

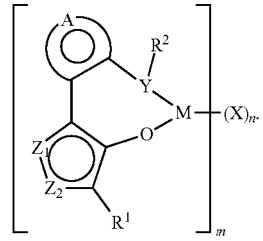

16 Claims, 1 Drawing Sheet

BIARYL PHENOXY GROUP IV TRANSITION METAL CATALYSTS FOR OLEFIN POLYMERIZATION

CROSS REFERENCE TO RELATED APPLICATION

This application is a National Stage Entry under 35 U.S.C. § 371 of International Patent Application No. PCT/US2018/038275, filed Jun. 19, 2018 which claims the benefit of U.S. Provisional Patent Application Ser. No. 62/522,213, filed Jun. 20, 2017 which is hereby incorporated by reference in its entirety.

TECHNICAL FIELD

Embodiments of the present disclosure generally relate to olefin polymerization catalyst systems and processes, and, more specifically, the synthesis of biaryl phenoxy group IV transition metal catalysts for olefin polymerization and to olefin polymerization processes incorporating the catalyst systems.

BACKGROUND

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents, such as an alkane or isoalkane, for example isobutane. Hydrogen may also be added to the reactor. The catalyst systems for producing polyethylene may typically comprise a chromium-based catalyst system, a Ziegler-Natta catalyst system, or a molecular (either metallocene or non-metallocene) catalyst system. The reactants in the diluent and the catalyst system are circulated at an elevated polymerization temperature around the reactor thereby producing polyethylene homopolymer or copolymer. Either periodically or continuously, part of the reaction mixture, including the polyethylene product dissolved in the diluent, together with unreacted ethylene and one or more optional co-monomers, is removed from the reactor. The reaction mixture when removed from the reactor may be processed to remove the polyethylene product from the diluent and the unreacted reactants, with the diluent and unreacted reactants typically being recycled back into the reactor. Alternatively, the reaction mixture may be sent to a second reactor, e.g. reactor, serially connected to the first reactor where a second polyethylene fraction may be produced.

Despite the research efforts in developing catalyst systems suitable for olefin polymerization, such as polyethylene or polypropylene polymerization, there is still a need for a pro-catalyst and a catalyst system exhibiting a higher efficiency and comonomer incorporation than comparative catalyst systems, which are capable of producing polymer with high molecular weights and a narrow molecular weight distribution.

SUMMARY

According to some embodiments, a catalyst system includes a metal-ligand complex according to formula (I):

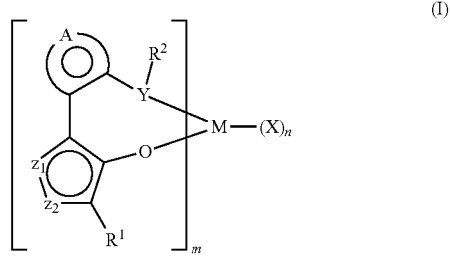

(I)

In formula (I), M is a metal chosen from titanium, zirconium, or hafnium, the metal having a formal oxidation state of +2, +3, or +4; and each X is a monodentate or bidentate ligand independently chosen from unsaturated $(C_2-C_{50})$heterohydrocarbon, unsaturated $(C_2-C_{50})$hydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, $-N(R^N)_2$, and $-NCOR^C$. Subscript n of $(X)_n$ is an integer 1, 2, or 3. Subscript m is 1 or 2. The metal-ligand complex of formula (I) has 6 or fewer metal-ligand bonds and may be charge neutral or have a positive charge associated with the metal center. Each Y is independently selected from oxygen or sulfur.

In formula (I), each $R^1$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^P)_2P(O)-$, $(R^C)_2C=N-$, $R^CC(O)O-$, $R^COC(O)-$, $R^CC(O)N(R)-$, $(R^C)_2NC(O)-$, halogen, and $-H$. Each $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, and $-Ge(R^C)_3$; and for each individual ring containing groups $z_1$ and $z_2$, each of $z_1$ and $z_2$ is independently selected from the group consisting of sulfur, oxygen, $-N(R^R)-$, and $-C(R^R)-$, provided that at least one of $z_1$ or $z_2$ is $-C(R^R)-$.

In formula (I), each A is independently chosen from $-z_3-z_4-z_5-$ or $-C(R^3)C(R^4)C(R^5)C(R^6)-$, such that when A is $-z_3-z_4-z_5-$, each of $z_3$, $z_4$, and $z_5$ is selected from the group consisting of sulfur, oxygen, $-N(R^R)-$, and $-C(R^R)-$, provided that exactly one of $z_3$, $z_4$, or $z_5$ is $-C(R^R)-$ or that exactly two of $z_3$, $z_4$, or $z_5$ are $-C(R^R)-$. When A is $-C(R^3)C(R^4)C(R^5)C(R^6)-$, each $R^3$, $R^4$, $R^5$, and $R^6$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^P)_2P(O)-$, $(R^C)_2C=N-$, $R^CC(O)O-$, $R^COC(O)-$, $R^CC(O)N(R)-$, $(R^C)_2NC(O)-$, halogen, or $-H$.

Each $R^C$, $R^N$, and $R^P$ in formula (I) is independently a $(C_1-C_{50})$hydrocarbyl; and each $R^R$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^P)_2P(O)-$, $(R^C)_2C=N-$, $R^CC(O)O-$, $R^COC(O)-$, $R^CC(O)N(R)-$, $(R^C)_2NC(O)-$, halogen, or $-H$, wherein any two $R^R$ groups bonded to neighboring atoms are optionally linked.

DETAILED DESCRIPTION

Figure 1:
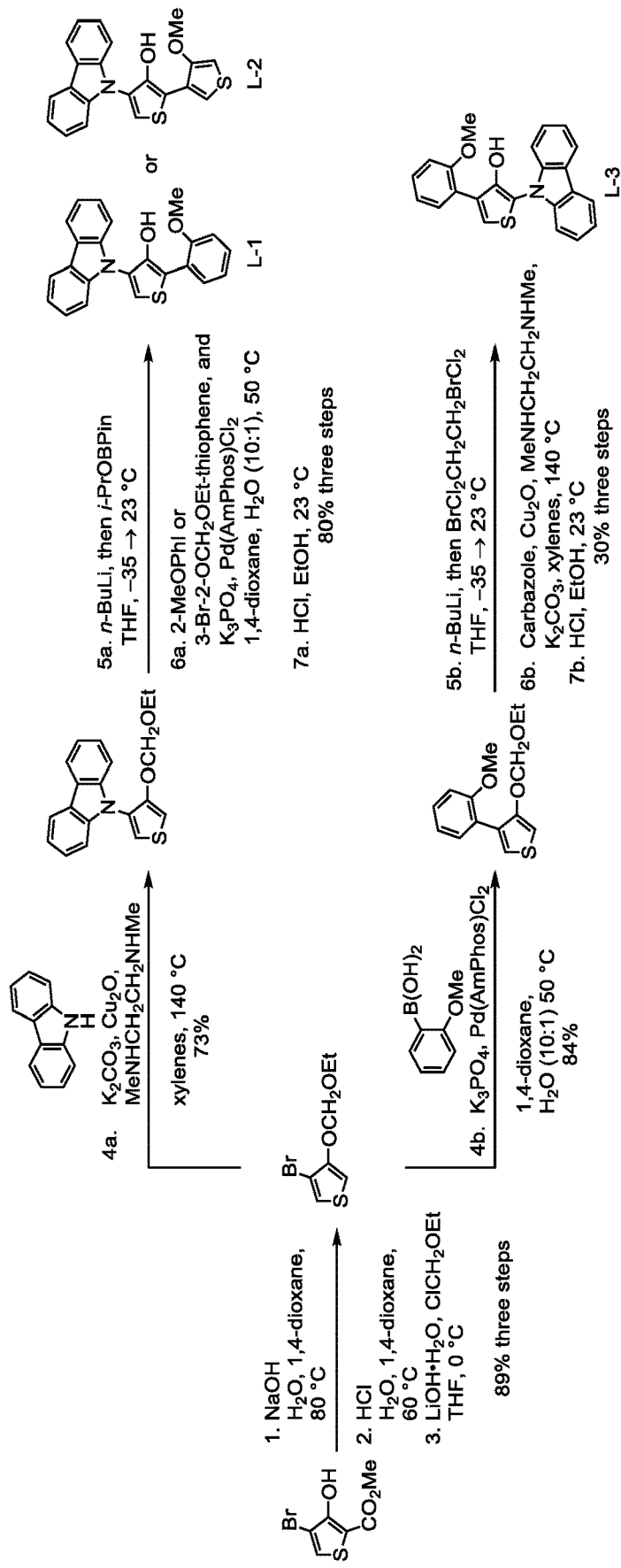
FIG. 1 depicts a seven step synthetic scheme to synthesize ligands 1-3 (L-1 to L-3), in which L-3 is synthesized with a different reagent in the fourth step.

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$ dichloromethane; CV: column volume (used in column chromatography); EtOAc: ethyl acetate; $C_6D_6$: deuterated benzene or benzene-d6; $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $Cu_2O$: Copper (I) Oxide; N,N'-DMEDA: N,N'-dimethylethylenediamine; $K_3PO_4$: Potassium phosphate tribasic; $Pd(AmPhos)Cl_2$: Bis(di-tert-butyl(4-dimethylaminophenyl)phosphine)dichloropalladium(II); Pd(dppf)$Cl_2$: [1,1'-Bis(diphenylphosphino)ferrocene]palladium(II) dichloride; $K_2CO_3$: potassium carbonate; $Cs_2CO_3$: cesium carbonate; i-PrOBPin: 2-isopropoxy-4,4,5,5-tetramethyl-1,3,2-dioxaborolane; $BrCl_2CCCl_2Br$: 1,2-dibromotetrachloroethane; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $ZrBn_2Cl_2(OEt_2)$: zirconium (IV) dibenzyl dichloride mono-diethyletherate; $HfBn_2Cl_2(OEt_2)$: hafnium (IV) dibenzyl dichloride mono-diethyletherate; $TiBn_4$: titanium (IV) tetrabenzyl; $N_2$: nitrogen gas; PhMe: toluene; PPR: parallel polymerization reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; $R_f$: retention fraction; TLC: thin layered chromatography; rpm: revolution per minute.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc. A chemical name attached to an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [$C_{45}$]alkyl. The term "[$C_{45}$]alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_0-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclyc aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; idacenyl; hexahyddacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycioheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{20})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkyene, and $(C_1-C_{50})$alkylene (e.g., $(C_1-C_{20})$alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicais, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "$C^*$" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(Cl_3)_2(CH_2)_5$— (i.e., a 6,6-dimethyl substituted normal-1,20-eicosylene). Since as mentioned previously two $R^S$ may be taken together to form a $(C_1-C_1)$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1] heptane, and 2,3-bis(methylene)bicyclo [2.2.2] octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, —N=$C(R^C)_2$, —$Ge(R^C)_2$—, or —$Si(R^C)$—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-$S(O)_2$—, $(C_1-C_{50})$hydrocarbyl-$Si(R^C)_2$—, $(C_1-C_{50})$hydrocarbyl-N($R^N$)—, $(C_1-C_{50})$hydrocarbyl-P($R^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene. $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclyc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradicals containing from 1 to 50 carbon atoms and one or more than one heteroatoms. The heteroatoms of the heteroalkyls or the heteroalkylenes may include $Si(R^C)_3$, $Ge(R^C)_3$, $Si(R^L)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including double bonds that may be present in substituents $R^S$, if any, or in (hetero) aromatic rings, if any.

Embodiments of this disclosure include catalyst systems that include a metal-ligand complex according to formula (I):

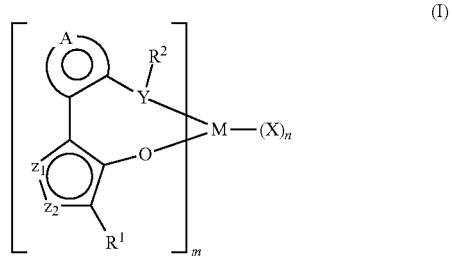

(I)

In formula (I), M is a metal chosen from titanium, zirconium, or hafnium, the metal having a formal oxidation state of +2, +3, or +4. Each X is a monodentate or bidentate ligand independently chosen from unsaturated $(C_2-C_{50})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, $—N(R^N)_2$, and $—NCOR^C$. The subscript n of $(X)_n$, referring to a number of ligands X bonded to or associated with the metal M, is an integer 1, 2, or 3. The subscript m is 1 or 2. The metal-ligand complex has 6 or fewer metal-ligand bonds and can be overall charge-neutral or may have a positive-charge associated with the metal center. Each Y is independently selected from oxygen or sulfur.

In embodiments, the catalyst system may include a metal-ligand complex according to formula (I), in which each $R^1$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, $—Si(R^C)_3$, $—Ge(R^C)_3$, $—P(R^P)_2$, $—N(R^N)_2$, $—OR^C$, $—SR^C$, $—NO_2$, $—CN$, $—CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, halogen, and $—H$. Each $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, $—Si(R^C)_3$, and $—Ge(R^C)_3$.

In some catalyst systems of this disclosure, the catalyst system may include a metal-ligand complex according to formula (I), in which for each individual ring containing groups $z_1$ and $z_2$, each of $z_1$ and $z_2$ is independently selected from the group consisting of sulfur, oxygen, $—N(R^R)—$, or $—C(R^R)—$, and at least one of $z_1$ or $z_2$ is $—C(R^R)—$. Any two $R^R$ groups bonded to neighboring atoms are optionally linked. In some embodiment, for each individual ring containing groups $z_1$ and $z_2$, one of $z_1$ and $z_2$ is a sulfur atom, and the other of $z_1$ and $z_2$ is $—C(H)—$.

In formula (I), each A is independently chosen from $-z_3-z_4-z_5-$ or $—C(R^3)C(R^4)C(R^5)C(R^6)—$. When A is $-z_3-z_4-z_5-$, at least one $z_3$, $z_4$, and $z_5$ is selected from the group consisting of sulfur, oxygen, $—N(R^R)—$, and $—C(R^R)—$, provided that exactly one of $z_3$, $z_4$, or $z_5$ is $—C(R^R)—$ or that exactly two of $z_3$, $z_4$, or $z_5$ are $—C(R^R)—$. Each $R^R$ is independently chosen from $(C_1-C_{50})$hydrocarbyl, $(C_1-C_{50})$heterohydrocarbyl, $(C_6-C_{50})$aryl, $(C_4-C_{50})$heteroaryl, halogen, or $—H$. When A is $—C(R^3)C(R^4)C(R^5)C(R^6)—$, each $R^3$, $R^4$, $R^5$, and $R^6$ is independently chosen from $(C_1-C_{50})$hydrocarbyl, $(C_1-C_{50})$heterohydrocarbyl, $(C_6-C_{50})$aryl, $(C_4-C_{50})$heteroaryl, $—Si(R^C)_3$, $—Ge(R^C)_3$, $—P(R^P)_2$, $—P(O)(R^P)_2$, $—N(R^N)_2$, $—OR^C$, $—SR^C$, $—NO_2$, $—CN$, $—CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, halogen, or $—H$, wherein any two $R^R$ groups bonded to neighboring atoms are optionally linked. In formula (I), each $R^C$, $R^N$, and $R^P$ in formula (I) is independently a $(C_1-C_{30})$hydrocarbyl.

In formula (I), each ring containing A and each ring containing $z_1$ and $z_2$ is aromatic, as indicated by the delocalized π-bonds.

In some embodiments, the catalyst system includes a metal-ligand complex according to formula (I), in which M is zirconium or hafnium; each X is independently chosen from $(C_6-C_{20})$aryl, $(C_4-C_{20})$heteroaryl, $(C_4-C_{12})$diene, or a halogen; each Y is oxygen; and each $R^1$ is independently chosen from $(C_1-C_{50})$aryl, $(C_4-C_{50})$heteroaryl.

In some catalyst systems of this disclosure, the catalyst system may include a metal-ligand complex according to formula (I), in which each individual ring containing groups $z_1$ and $z_2$, one of $z_1$ and $z_2$ is sulfur, and the other is —C(H)—. In some embodiments, each A is —C($R^3$)C($R^4$)C($R^5$)C($R^6$)—, and each $R^3$, $R^4$, $R^5$, and $R^6$ is —H.

In one or more embodiments, each $R^2$ is chosen from methyl, ethyl, propyl, 2-propyl, 2-methylpropyl, n-butyl, tert-butyl (also called 1,1-dimethylethyl), pentyl, hexyl, heptyl, tert-octyl (also called 1,1,3,3-tetramethylbutyl), n-octyl, nonyl, chlorine, fluorine, or —H.

In some embodiments of formula (I), each $R^1$ is carbazolyl and each $R^2$ is methyl. In other embodiments, each $R^1$ is tri-methylphenyl or tris(2-propyl)phenyl and $R^2$ is methyl.

In one or more embodiments, the catalyst system includes a metal-ligand complex according to formula (I), in which each Y independently is O, S, N$(C_1-C_{50})$hydrocarbyl, or P$(C_1-C_{50})$hydrocarbyl. In some embodiments, when m is 2, each Y is different and may be selected from oxygen and N$(C_1-C_{50})$hydrocarbyl, (for example, NC-$1H_3$). In other embodiments, when m is 2, each Y may be independently selected from O and S or independently selected from S and N$(C_1-C_{50})$hydrocarbyl. In further embodiments, when m is 2, each Y may be the same and selected from O and S.

According to other embodiments of this disclosure, the catalyst systems may include the metal-ligand complex of formula (I), wherein m is 2 and the metal-ligand complex has a structure according to formula (II):

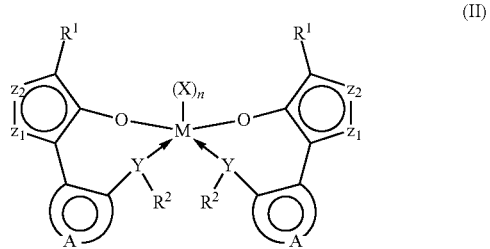

(II)

In formula (II), each $R^1$, $R^2$, $z_1$, $z_2$, A, Y, and X are as defined in formula (I); and subscript n of $(X)_n$ is 1 or 2. It should be readily understood that all metal-ligand complexes according to formula (II) are also complexes according to formula (I). Therefore, embodiments described with respect to metal-ligand complexes according to formula (II) necessarily apply to complexes according to formula (I).

In one or more embodiments, the catalyst system may include a metal-ligand complex according to formula (II), in which M is titanium, zirconium, or hafnium; each X is independently chosen from $(C_6-C_{50})$aryl, $(C_6-C_{50})$heteroaryl, $(C_4-C_{12})$diene, or halogen; each Y is oxygen; each $R^1$ and $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, halogen, and hydrogen.

In one or more embodiments, the catalyst system may include a metal-ligand complex according to formula (II), in which each individual ring containing groups $z_1$ and $z_2$, one of $z_1$ and $z_2$ is sulfur, and the other is —C(H)—.

In one or more embodiments of the catalyst system according to metal-ligand complex of formula (II), $R^1$ may be chosen from radicals having formula (V), radicals having formula (VI), or radicals having formula (VII):

(V)

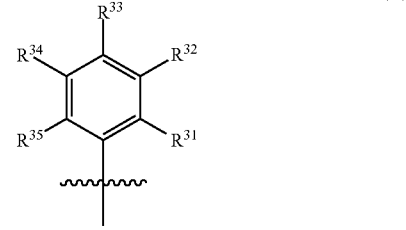

(VI)

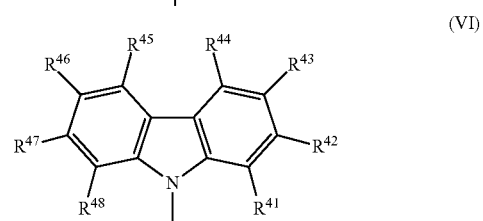

(VII)

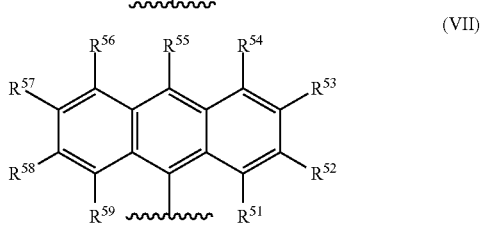

When present in the metal-ligand complex of formula (I) or formula (II) as part of a radical having formula (V), formula (VI), or formula (VI), the groups $R^{31-35}$, $R^{41-48}$, and $R^{51-59}$ of the metal-ligand complex of formulas (I) or (II) are each independently chosen from $(C_1-C_{40})$hydrocarbyl, $(C_1-C_{40})$heterohydrocarbyl, Si$(R^C)_3$, P$(R^P)_2$, N$(R^N)_2$, O$R^C$, S$R^C$, NO$_2$, CN, CF$_3$, $R^C$S(O)—, $R^C$S(O)$_2$—, $(R^C)_2$C=N—, $R^C$C(O)O—, $R^C$OC(O)—, $R^C$C(O)N($R^N$)—, $(R^N)_2$NC(O)—, halogen, hydrogen (—H), or combinations thereof. Independently each $R^C$, $R^P$, and $R^N$ are unsubstituted $(C_1-C_{18})$hydrocarbyl, $(C_1-C_{30})$heterohydrocarbyl, or —H.

In some embodiments, any or all of the chemical groups (e.g., X, $R^1$, $R^2$, $R^{31-59}$, z, A, and Y) of the metal-ligand complex of formula (I) may be unsubstituted. In other embodiments, none, any, or all of the chemical groups X, $R^1$, $R^2$, $R^{31-59}$, z, A, and Y of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X, $R^1$, $R^2$, $R^{31-59}$, and Z may be per substituted with $R^S$. In the chemical groups that are per substituted with $R^S$, the individual $R^S$ may all be the same or may be independently chosen.

Each $R^1$ in the metal-ligand complex of formula (I) or formula (II) are chosen independently of one another. For example, one group $R^1$ may be chosen from a radical having formula (V), (VI), or (VII) and the other group $R^1$ may be a $(C_1-C_{40})$hydrocarbyl; or one group $R^1$ may be chosen from a radical having formula (V), (VI), or (VII) and the other group $R^1$ may be chosen from a radical having formula (V), (VI), or (VII) the same as or different from that of $R^1$. Both group $R^1$ may be radicals of formula (V), for which the groups $R^{31-35}$ are the same or different in each $R^1$. In other examples, both groups $R^1$ may be radicals of formula (VI), for which the groups $R^{41-48}$ are the same or different in each $R^1$; or both groups $R^1$ may be radicals of formula (VII), for which the groups $R^{51-59}$ are the same or different in each $R^1$.

In some embodiments of the metal-ligand complex of formula (I) or formula (II), at least one of $R^1$ is a radical having formula (V), where $R^{32}$ and $R^{34}$ are tert-butyl.

In some embodiments the metal-ligand complex of formula (I) or formula (II), when at least one of $R^1$ is a radical having formula (VI), one of or both of $R^{43}$ and $R^{46}$ is tert-butyl and each of $R^{41-42}$, $R^{44-45}$, and $R^{47-48}$ are —H. In other embodiments, one of or both of $R^{42}$ and $R^{47}$ is tert-butyl and $R^{41}$, $R^{43-46}$, and $R^{48}$ are —H. In some embodiments, both $R^{42}$ and $R^{47}$ are —H.

In one or more embodiments of the catalyst system according to metal-ligand complex (II), each $R^1$ is chosen from 2,4,6-trimethylphenyl; carbazolyl; 3,6-di-tert-butylcarbazol-9-yl; 2,7-di-tert-butylcarbazol-9-yl; or 3,5-di-tert-butylphenyl. In some embodiments, each $R^2$ is methyl or —H.

In illustrative embodiments, the catalyst systems may include a metal-ligand complex according to any of formulas (I) or (II) having the structure of any of Procatalysts 1-9:

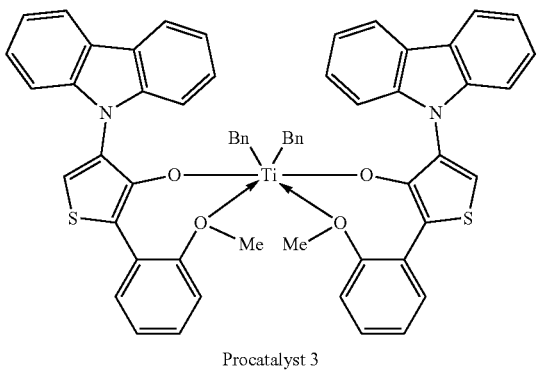

Procatalyst 3

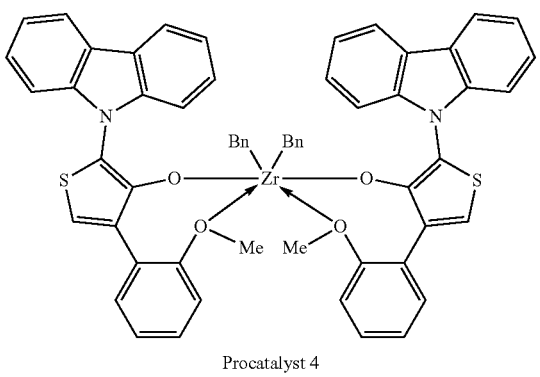

Procatalyst 4

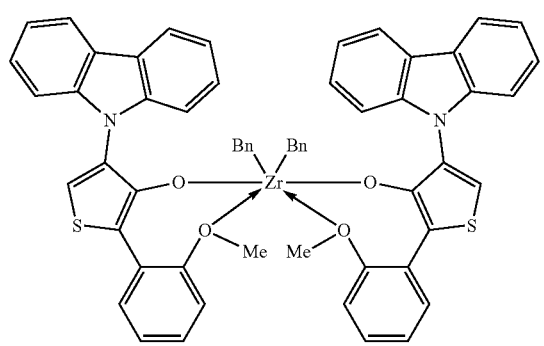

Procatalyst 1

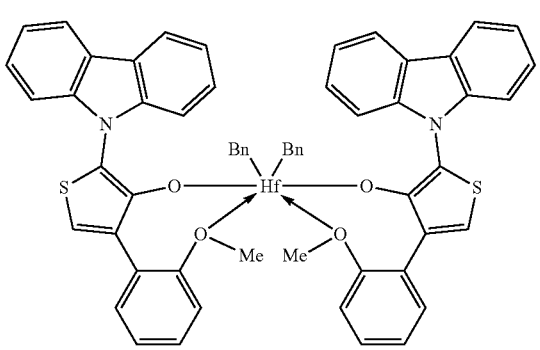

Procatalyst 5

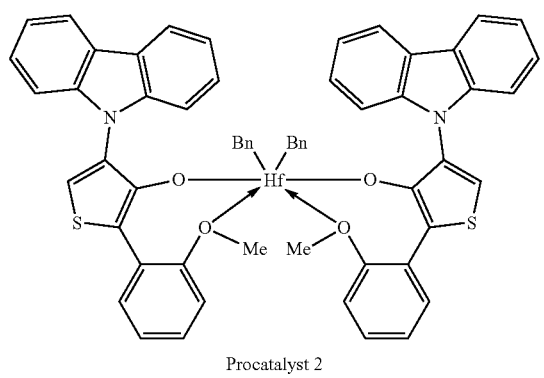

Procatalyst 2

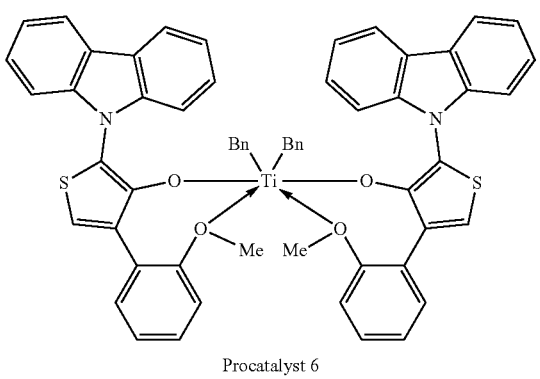

Procatalyst 6

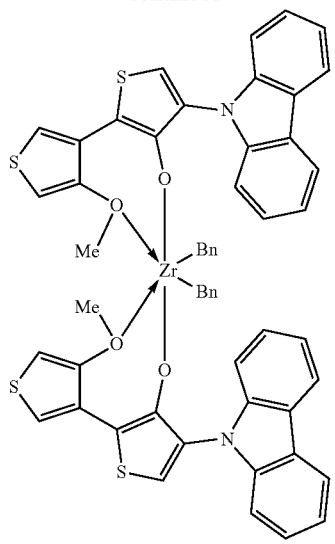
Procatalyst 7
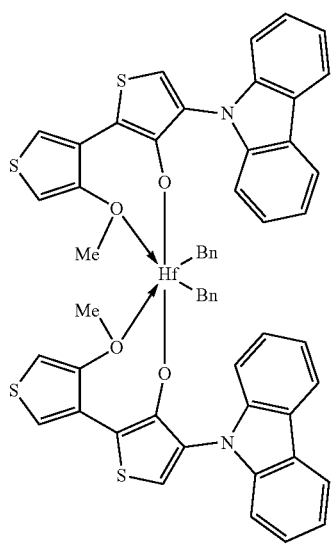
Procatalyst 8
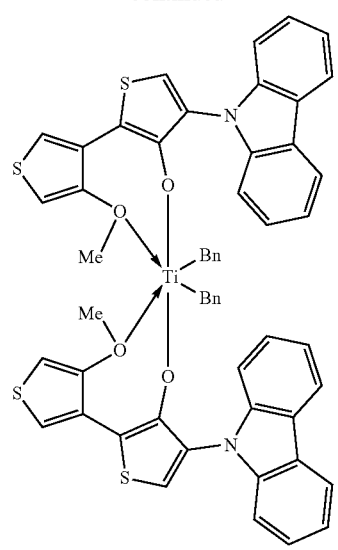
Procatalyst 9
In illustrative embodiments, the metal-ligand complex according to any of formulas (I) or (II) having the structure of any of Procatalysts 1-9 may be formed from Ligands 1-3.
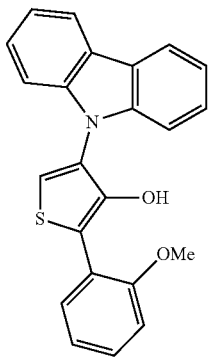
L-1
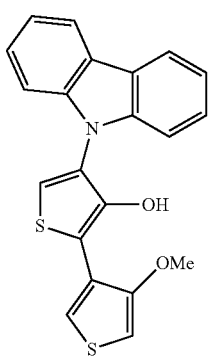
L-2

-continued

L-3

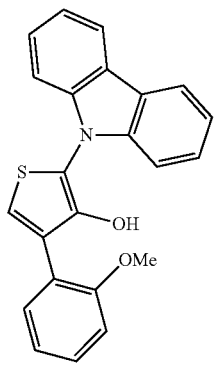

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing $(C_1-C_{20})$hydrocarbyl substituents as described herein. In some embodiments, Group 13 metal compounds are tri$((C_1-C_{20})$hydrocarbyl)-substituted-aluminum or tri$((C_1-C_{20})$hydrocarbyl)-boron compounds. In other embodiments, Group 13 metal compounds are tri(hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris$((C_1-C_{20})$hydrocarbyl borate (e.g. trityl tetrafluoroborate) or a tri$((C_1-C_{20})$hydrocarbyl)ammonium tetra$((C_1-C_{20})$hydrocarbyl)borane (e.g. bis(octadecyl)methylammonium tetrakis(pentafluorophenyl)borane). As used herein, the term "ammonium" means a nitrogen cation that is a $((C_1-C_2)$hydrocarbyl$)_4{}^N$ a $((C_1-C_{20})$hydrocarbyl$)_3$N(H)$^+$, a $((C_1-C_{20})$hydrocarbyl$)_2$N(H)$_2$, $(C_1-C_{20})$hydrocarbylN(H)$_3$, or N(H)$_4{}^+$, wherein each $(C_1-C_{20})$hydrocarbyl, when two or more are present, may be the same or different.

Combinations of neutral Lewis acid activating co-catalysts include mixtures comprising a combination of a tri$((C_1-C_4)$alkyl)aluminum and a halogenated tri$((C_6-C_{18})$aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri$((C_1-C_4)$hydrocarbyl)aluminum, tri$((C_1-C_4)$hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 1 mole percent (mol %) to 25 mol %; and in further embodiments the amount of additional α-olefin includes at least 5 mol % to 103 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene based polymers and the one or more additives. The ethylene-based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formulas (I), (II) and (III). The polymer resulting from such a catalyst system that incorporates the metal-ligand complex of formula (I), (II), or (III) may have a density according to ASTM D792 (incorporated herein by reference in its entirety) from 0.850 $g/cm^3$ to 0.950 $g/cm^3$, from 0.880 $g/cm^3$ to 0.920 $g/cm^3$, from 0.880 $g/cm^3$ to 0.910 $g/cm^3$, or from 0.880 $g/cm^3$ to 0.900 $g/cm^3$, for example.

In another embodiment, the polymer resulting from the catalyst system that includes the metal-ligand complex of formulas (I), (II) and (III) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formulas (I), (II), and (III) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. 1H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for 1H NMR data are reported in ppm downfield from internal tetramethylsilane (TMS, δ scale) using residual protons in the deuterated solvent as references. 13C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel polymerization reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, $H_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Examples 1 to 19 are synthetic procedure for intermediates of the ligands, ligands, and the isolated procatalysts, and refer to FIG. 1. One or more features of the present disclosure are illustrated in view of the examples as follows:

Procatalyts 1 to 9 were synthesized from Ligands 1 to 3 which are presented in FIG. 1. Ligands 1 to 3 were synthesized by a scheme shown in FIG. 1.

Example 1: Synthesis of Hydroxy-Thiophene Intermediate—Steps 1 and 2 in FIG. 1

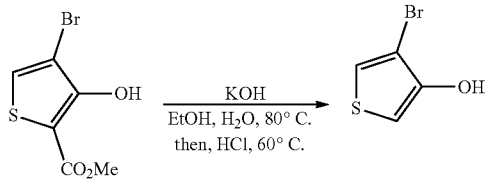

To a suspension of the hydroxyl-thiopene (9.000 grams, 37.964 mmol, 1.00 eq) in EtOH/H$_2$O (150 mL, 1:1) under nitrogen was added NaOH (42.200 g, 1.055 mol, 27.79 eq) all at once. The now yellow-orange mixture was equipped with a reflux condenser and placed in a mantle heated to 80° C. After stirring (500 rpm) for 2.5 hrs TLC of the now golden orange solution indicated complete conversion of the starting thiophene to a lower R$_f$ spot. The mixture was removed from the heating mantle, allowed to gradually cool to 23° C., placed in an ice water bath for 60 mins, aqueous HCl (250 mL, 1 N) was added followed by concentrated HCl (30 mL, 37%), and then EtOH (25 mL) was added to the now white heterogeneous mixture to aid solubility of the carboxylic acid intermediate. The now white mixture was removed from the ice water bath, placed in a mantle heated to 60° C., after stirring vigorously (1000 rpm) for 5 hrs the golden orange solution was removed from the mantle, allowed to cool gradually to 23° C., poured into a separatory funnel, diluted with CH$_2$Cl$_2$ (100 mL), partitioned, organics were washed with aqueous HCl (2×100 mL, 1 N), residual organics were extracted from the aqueous layer using CH$_2$Cl$_2$ (2×50 mL), dried over solid Na$_2$SO$_4$, decanted, carefully concentrated (Caution: Product is volatile), diluted with CH$_2$Cl$_2$ (20 mL), suction filtered over silica gel, eluted with CH$_2$Cl$_2$ (4×25 mL), the pale golden filtrate solution was concentrated onto celite, and purified via silica gel chromatography using an ISCO chromatography purification system; 10% CH$_2$Cl$_2$–50% CH$_2$Cl$_2$ in hexanes to afford the bromo-hydroxythiophene as a pale golden brown oil (6.072 g, 33.912 mmol, 90%). NMR indicated pure product which exists as a mixture of keto-enol tautomers. (Note: The product can be used directly in the subsequent reaction after the 1$^{st}$ silica gel suction filtration. No column chromatography is necessary). The hydroxy-thiophene was used in the subsequent reaction without further purification. The product yield was a combination of a mixture of keto-enol tautomers. The ketone tautomer is represented by an asterisk (*).

$^1$H NMR (400 MHz, Chloroform-d) δ (8.34 (s, 1H)*), 7.12 (d, J=3.7 Hz, 1H), 6.43 (d, J=3.7 Hz, 1H), 5.49 (s, 1H), (3.72 (s, 2H)*). $^{13}$C NMR (101 MHz, Chloroform-d) δ (210.23*), 195.46, 160.19, (149.69*), 121.43, (111.65*), (103.07*), 100.24, (37.05*).

Example 2: Step 3 in FIG. 1—Synthesis of Precursor to Ligands 1-14

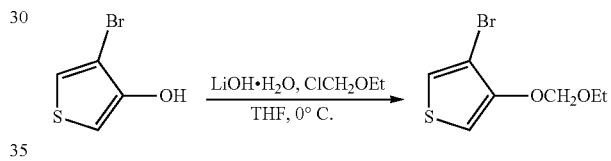

A clear golden yellow solution of the hydroxyl-thiophene (10.119 g, 56.521 mmol, 1.00 eq) in non-anhydrous THF (600 mL) under nitrogen was placed in an ice water bath, and the clear solution was sparged with nitrogen for 1 hr, and then placed under a positive flow of nitrogen upon which solid lithium hydroxide-monohydrate (4.741 g, 113.04 mmol, 2.00 eq) was added followed by deionized water (1.0 mL). The mixture changed to a golden red-brown solution after stirring vigorously (1000 rpm) for 1 hr upon which neat chloromethylethyl ether (15.7 mL, 169.56 mmol, 3.00 eq) was added via syringe in a quick dropwise manner. After stirring for 2 hrs at 0° C. the red-orange solution was diluted with aqueous NaOH (200 mL, 1 N), stirred for 2 mins, THF was removed in vacuo, the biphasic mixture was diluted with CH$_2$Cl$_2$ (100 mL), poured into a separatory funnel, partitioned, organics were washed with aqueous NaOH (2×100 mL, 1 N), residual organics were extracted from the aqueous using CH$_2$Cl$_2$ (2×50 mL), combined, dried over solid Na$_2$SO$_4$, decanted, and carefully concentrated to afford a brown amorphous oil which was diluted with CH$_2$Cl$_2$ (25 mL), suction filtered over a pad of silica gel, rinsed with CH$_2$Cl$_2$ (4×50 mL), and the filtrate was concentrated to afford the thiophene-ether as a pale golden brown oil (11.275 g, 47.551 mmol, 84%).

$^1$H NMR (400 MHz, Chloroform-d) δ 7.15 (d, J=3.6 Hz, 1H), 6.61 (d, J=3.5 Hz, 1H), 5.19 (s, 2H), 3.73 (q, J=7.1 Hz, 2H), 1.22 (t, J=7.1 Hz, 3H). $^{13}$C NMR (101 MHz, Chloroform-d) δ 151.51, 121.50, 103.84, 101.55, 95.07, 64.53, 15.05.

Example 3: Synthesis of a Carbazoyl Thiopene—Step 4a in FIG. 1

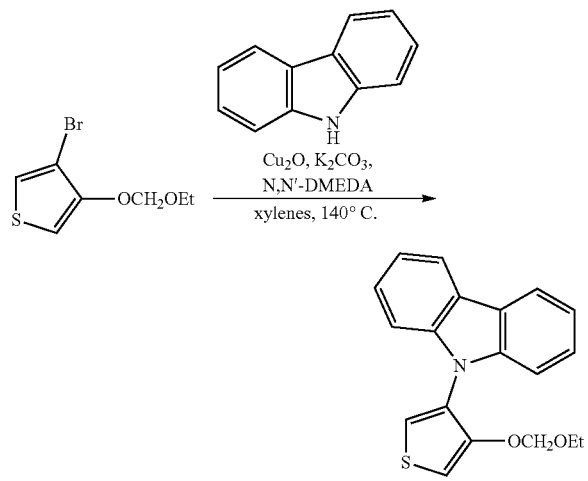

A mixture of the bromothiophene (1.034 g, 4.361 mmol, 1.00 eq), carbazole (1.604 g, 9.594 mmol, 2.20 eq), Cu₂O (1.248 g, 8.722 mmol, 2.00 eq), and K₂CO₃ (6.027 g, 43.610 mmol, 10.00 eq) was evacuated, back-filled with N₂, this process was repeated 4× more, deoxygenated anhydrous xylenes (22 mL) was added via syringe followed by N,N'-DMEDA (1.90 mL, 17.440 mmol, 4.00 eq) via syringe, the mixture placed in a mantle heated to 140° C., stirred (500 rpm) for 72 hrs, removed from the mantle, the now deep red-black mixture was allowed to cool gradually to 23° C., silica gel was added, the mixture was suction filtered over a pad of silica gel, washed with CH₂Cl₂ (4×30 mL), and the golden brown filtrate was concentrated onto celite, and purified several times via silica gel chromatography using an ISCO chromatography purification system; 15% CH₂Cl₂ in hexanes to afford the thiophene-carbazole product as a white crystalline solid (1.006 g, 3.110 mmol, 71%). Mixed fractions were collected and re-purified using the same method.

¹H NMR (500 MHz, Chloroform-d) δ 8.12 (dt, J=7.7, 1.0 Hz, 2H), 7.43-7.38 (m, 3H), 7.31-7.26 (m, 4H), 6.90 (d, J=3.6 Hz, 1H), 5.04 (s, 2H), 3.53 (q, J=7.1 Hz, 2H), 1.14 (t, J=7.0 Hz, 3H). ¹³C NMR (126 MHz, Chloroform-d) δ 150.82, 141.23, 127.05, 125.77, 123.17, 120.78, 120.14, 119.80, 110.17, 102.44, 94.75, 64.42, 14.99.

Example 4: Synthesis of the Thiophene Boropinacolate Ester—Step 5a FIG. 1

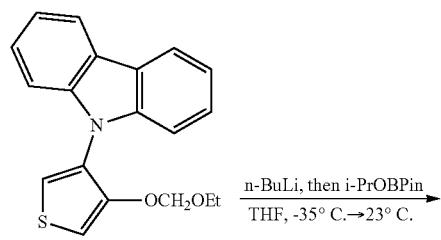

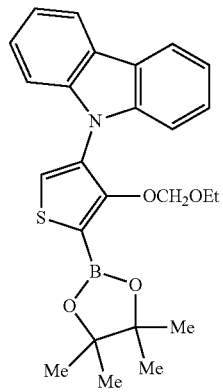

A clear pale yellow solution of the thiophene (0.410 g, 1.268 mmol, 1.00 eq) in anhydrous deoxygenated THF (30 mL) in a nitrogen filled glovebox was placed in the freezer cooled to −35° C. for 12 hrs upon which pre-cooled n-BuLi (0.73 mL, 1.902 mmol, 1.50 eq, titrated 2.61 M in hexanes) was added in a quick dropwise manner. After 3 hrs in the freezer isopropoxy-boronpinacolate (0.52 mL, 2.536 mmol, 2.00 eq) was added neat via syringe in a quick dropwise manner. The pale yellow solution changed to a slightly pale yellow mixture which was removed from the freezer, and after stirring for 2 hrs at 23° C. the white heterogeneous mixture was removed from the glovebox, neutralized with an aqueous phosphate buffer (50 mL, pH=8, 0.05 M), concentrated to remove THF, diluted with CH₂Cl₂ (20 mL), poured into a separatory funnel, partitioned, organics were washed with an aqueous phosphate (2×50 mL, pH=8, 0.05 M), residual organics were extracted from the aqueous using CH₂Cl₂ (2×20 mL), combined, dried over solid Na₂SO₄, decanted, and concentrated. The crude yellow mixture was dissolved in CH₂Cl₂ (10 mL), suction filtered through a pad of silica gel, rinsed with CH₂Cl₂ (4×20 mL), and concentrated to afford the thiophene boropinacolate as an amorphous white foam (0.560 g, 1.246 mmol, 98%). NMR indicated product which contains trace impurities including the undesired isomer and starting i-PrO-BPin. The slightly impure product was used in the subsequent reaction without further purification.

¹H NMR (400 MHz, Chloroform-d) δ 8.08 (dt, J=7.8, 1.0 Hz, 2H), 7.65 (s, 1H), 7.38 (ddd, J=8.2, 7.0, 1.2 Hz, 2H), 7.31 (dt, J=8.2, 1.0 Hz, 2H), 7.28-7.22 (m, 2H), 4.88 (s, 2H), 2.80 (q, J=7.1 Hz, 2H), 1.36 (s, 9H), 0.48 (t, J=7.1 Hz, 3H). ¹³C NMR (126 MHz, Chloroform-d) δ 159.02, 141.07, 130.52, 127.88, 125.96, 123.07, 119.99, 119.91, 110.45, 98.40, 84.27, 64.43, 24.81, 14.07.

Example 5: Synthesis of the Anisole-Thiophene—Step 6a FIG. 1

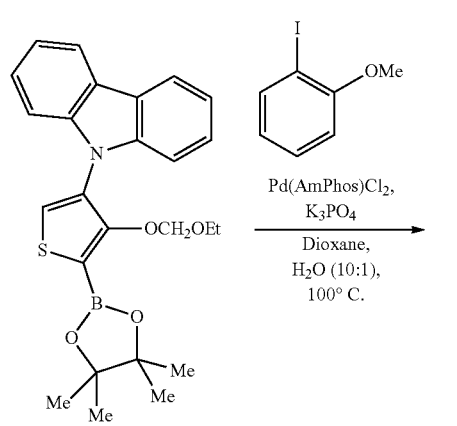

Example 6: Synthesis of Ligand 1—Step 7a in FIG. 1

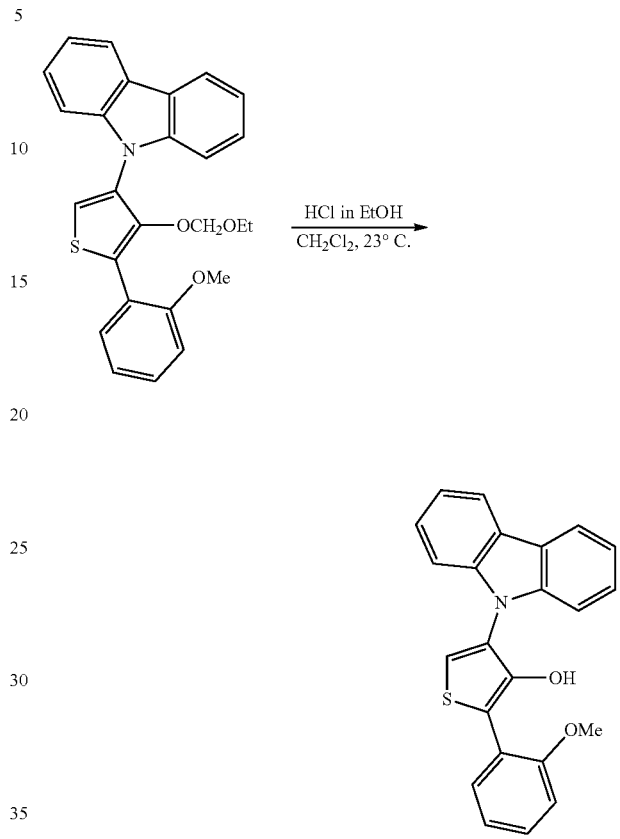

A mixture of Pd(AmPhos)Cl$_2$ (12.0 mg, 0.0167 mmol, 0.10 eq), thiophene boropinacolate ester (75.0 mg, 0.1669 mmol, 1.00 eq), and K$_3$PO$_4$ (106.0 mg, 0.5007 mmol, 3.00 eq) in a vial equipped with a stirbar was evacuated, then back-filled with nitrogen, this evacuation/back-fill process was conducted 4× more, then a solution of 2-iodoanisole (39.0 mg, 22.0 µL, 0.1669 mmol, 1.00 eq) in freshly deoxygenated 1,4-dioxane (3.0 mL) and then freshly deoxygenated water (0.30 mL) were added sequentially, the vial was capped under a positive flow of N$_2$, placed in a mantle heated to 100° C., the magenta solution was stirred (500 rpm) for 7 hrs, removed from the mantle, the now dark purple solution was allowed to cool to 23° C., diluted with CH$_2$Cl$_2$ (10 mL), suction filtered over a pad of silica gel, rinsed with CH$_2$Cl$_2$ (4×20 mL), and the resultant filtrate was concentrated onto celite, and purified via silica gel chromatography; 20%-25% CH$_2$Cl$_2$ in hexanes to afford the anisole-thiophene as an off-white amorphous foam (48.0 mg, 0.1118 mmol, 67%). NMR indicated product with trace impurities.

$^1$H NMR (500 MHz, Chloroform-d) δ 8.12 (d, J=7.8 Hz, 2H), 7.87 (dd, J=7.7, 1.6 Hz, 1H), 7.49-7.41 (m, 4H), 7.34 (t, J=7.7 Hz, 1H), 7.32-7.26 (m, 2H), 7.05 (t, J=7.5 Hz, 1H), 7.02 (d, J=8.3 Hz, 1H), 4.43 (s, 2H), 3.95 (s, 3H), 2.72 (q, J=7.1 Hz, 2H), 0.47 (t, J=7.1 Hz, 3H). $^{13}$C NMR (126 MHz, Chloroform-d) δ 156.44, 147.31, 141.00, 131.13, 129.23, 128.99, 125.98, 124.48, 123.12, 121.24, 120.69, 120.03, 119.91, 119.48, 111.30, 110.51, 97.02, 64.52, 55.74, 14.07. HRMS (ESI): calc'd [M+Na]$^+$ as 452.1291; found 452.1279.

To a solution of the thiophene-ether (136.0 mg, 0.3166 mmol, 1.00 eq) in CH$_2$Cl$_2$ (3 mL) was added HCl in EtOH (3 mL, non-titrated 1.25 M). The now golden yellow solution was stirred (300 rpm) for 12 hrs under nitrogen, diluted with aqueous HCl (10 mL, 1 N) and CH$_2$Cl$_2$ (10 mL), poured into a separatory funnel, partitioned, organics were washed with aqueous HCl (2×20 mL, 1 N), residual organics were extracted from the aqueous layer using CH$_2$Cl$_2$ (2×10 mL), combined, dried over solid Na$_2$SO$_4$, decanted, concentrated onto celite, and purified via silica gel chromatography using an ISCO chromatography purification system; 20% CH$_2$Cl$_2$ in hexanes to afford Ligand 1 (108.0 mg, 0.2907 mmol, 92%) as a pale yellow foam. NMR indicated pure product.

$^1$H NMR (500 MHz, Chloroform-d) δ 8.13 (d, J=7.8 Hz, 2H), 7.63 (dd, J=7.8, 1.7 Hz, 1H), 7.51 (s, 1H), 7.46-7.40 (m, 5H), 7.36 (td, J=7.9, 1.8 Hz, 1H), 7.32-7.24 (m, 3H), 7.16 (t, J=7.6 Hz, 1H), 7.07 (d, J=8.3 Hz, 1H), 3.98 (s, 3H). $^{13}$C NMR (126 MHz, Chloroform-d) δ 154.28, 146.50, 141.08, 130.51, 128.82, 127.37, 125.81, 123.23, 122.84, 122.69, 120.32, 120.18, 119.87, 115.56, 112.57, 110.40, 56.73. $^1$H NMR (500 MHz, Benzene-d$_6$) δ 8.01 (d, J=7.8 Hz, 2H), 7.59 (dd, J=7.6, 1.7 Hz, 1H), 7.39 (d, J=8.2 Hz, 2H), 7.34-7.26 (m, 3H), 7.20 (t, J=7.5 Hz, 2H), 6.89 (td, J=7.8, 1.7 Hz, 1H), 6.80 (m, 2H), 6.30 (d, J=8.3 Hz, 1H), 2.84 (s, 3H). $^{13}$C NMR (126 MHz, Benzene-d$_6$) δ 154.24, 147.17, 141.51, 130.24, 128.28, 125.80, 123.57, 122.83, 122.45, 120.51, 120.16, 119.91, 115.26, 112.29, 110.64, 55.34.

Example 7: Synthesis of Procatalyst 1

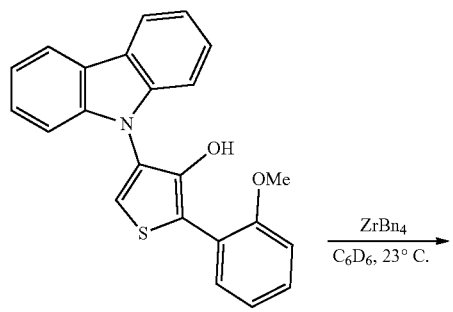

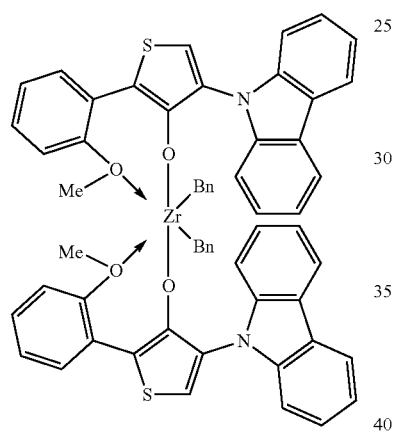

To a solution of zirconium tetrabenzyl (9.2 mg, 0.0202 mmol, 1.00 eq) in C$_6$D6 (0.18 mL) was added a solution of the hydroxy-thiophene, L-1, (15.0 mg, 0.0404 mmol, 2.00 eq) in C$_6$D$_6$ (0.30 mL) in a nitrogen filled glovebox at 23° C. After stirring (300 rpm) for 1 hr an aliquot was removed and NMR indicated complete conversion of the starting hydroxyl-thiophene. The pale yellow mixture was concentrated, the resultant golden yellow foam was suspended in hexanes/benzene (5 mL, 10:1), the mixture was stirred vigorously (1000 rpm) for 1 min, filtered through a 0.45 am PTFE filter, rinsed with hexanes/benzene (3×3 mL, 10:1), and the filtrate was concentrated to afford the zirconium complex Procatalyst 1 as a golden yellow amorphous foam (18.0 mg, 0.0177 mmol, 88%). NMR indicated product which contains minor impurities, isomers, and fluctionality.

$^1$H NMR (500 MHz, Benzene-d$_6$) δ 7.99-7.94 (m, 4H), 7.32-7.23 (m, 8H), 7.15 (td, J=7.3, 6.5, 1.4 Hz, 4H), 6.90-6.85 (m, 4H), 6.73 (d, J=1.3 Hz, 2H), 6.69 (tq, J=7.4, 1.4 Hz, 4H), 6.66-6.61 (m, 2H), 6.14-6.09 (m, 4H), 5.42-5.38 (m, 2H), 2.92 (s, 6H), 0.94 (s, 4H). $^{13}$C NMR (126 MHz, Benzene-d$_6$) δ 155.71, 151.95, 145.42, 140.70, 131.36, 129.07, 128.16, 127.93, 127.70, 127.55, 126.63, 126.15, 125.33, 123.37, 121.22, 120.15, 120.11, 119.76, 117.93, 117.10, 73.40, 62.75.

Example 8: Synthesis of Procatalyst 3

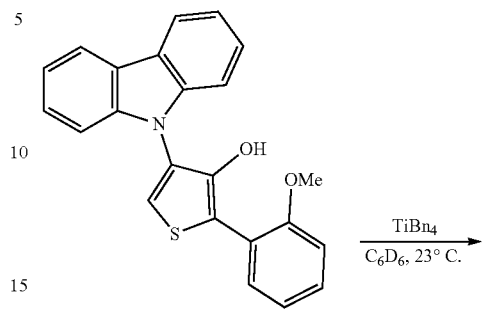

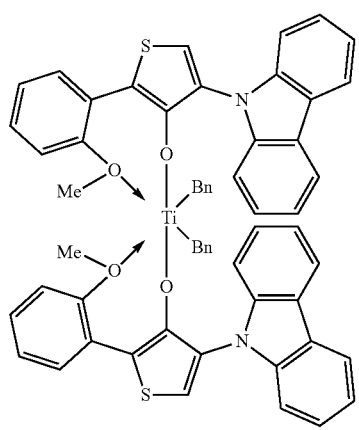

To a solution of titanium-tetrabenzyl (8.3 mg, 0.0202 mmol, 1.00 eq) in C$_6$D6 (0.32 mL) in a nitrogen filled glovebox at 23° C. was added a solution of the hydroxy-thiophene L-1 (15.0 mg, 0.0404 mmol, 2.00 eq) in C$_6$D$_6$ (0.32 mL) in a dropwise manner. The clear red solution was stirred for 1 hr upon which an aliquot was removed and NMR indicated the desired bis-[2,1] complex along with other minor isomers and impurities. The opaque mixture was concentrated, diluted with hexanes (3 mL), stirred for 2 mins, the resultant red mixture was filtered through a 0.45 am PTFE filter, rinsed with hexanes (3×3 mL), and the red filtrate was concentrated to afford the titanium complex Procatalyst 3 as a crimson red solid (14.8 mg, 0.0152 mmol, 75%). NMR indicated the bis-[2,1] complex.

$^1$H NMR (400 MHz, Benzene-d$_6$) δ 7.89 (ddd, J=7.8, 1.2, 0.7 Hz, 4H), 7.40 (dt, J=8.1, 0.9 Hz, 4H), 7.25 (ddd, J=8.3, 7.1, 1.2 Hz, 4H), 7.13-7.08 (m, 6H), 6.75 (d, J=1.1 Hz, 2H), 6.79-6.71 (m, 6H), 6.67-6.60 (m, 2H), 6.49 (td, J=7.6, 1.1 Hz, 2H), 6.15-6.09 (m, 4H), 5.82 (dd, J=8.3, 1.0 Hz, 2H), 2.97 (s, 6H), 1.29 (s, 4H). $^{13}$C NMR (101 MHz, Benzene-d$_6$) δ 156.29, 155.45, 144.73, 141.24, 130.81, 129.09, 128.15, 127.75, 127.20, 126.86, 126.09, 123.43, 123.08, 122.72, 122.23, 120.44, 120.24, 119.96, 118.11, 113.80, 110.89, 98.60, 57.07.

Example 9: Synthesis of Precursor to Ligand 3—FIG. 1

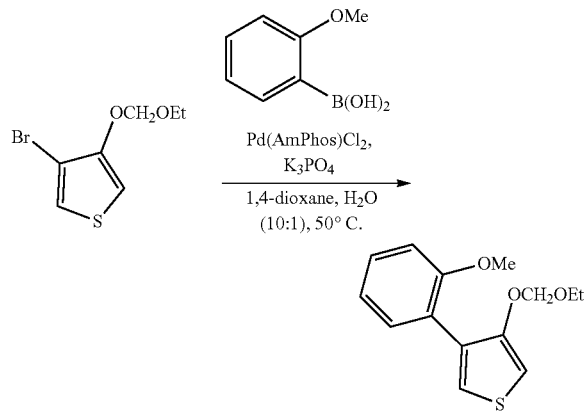

A solid mixture of the thiophene (200.0 mg, 0.8436 mmol, 1.00 eq, the product of Example 2), 2-methoxyphenyl boronic acid (192.0 mg, 1.265 mmol, 1.50 eq), K₃PO₄ (804.0 mg, 3.796 mmol, 4.50 eq), and Pd(AmPhos)Cl₂ (60.0 mg, 0.0844 mmol, 0.10 eq) in a vial equipped with a stirbar was evacuated, then back-filled with nitrogen, this process was repeated 4× more, upon which deoxygenated 1,4-dioxane (10.0 mL) and then deoxygenated water (1.0 mL) were added sequentially via syringe. The vial was sealed with a PTFE cap under a purging flow of nitrogen and placed in a mantle heated to 50° C. After stirring vigorously (1000 rpm) for 24 hrs, the dark red-black mixture was removed from the mantle, allowed to cool gradually to 23° C., diluted with CH₂Cl₂ (20 mL), suction filtered over silica gel using CH₂Cl₂ as the eluent, the golden orange filtrate was concentrated onto celite, and purified via silica gel chromatography; 10%-50% CH₂Cl₂ in hexanes to afford the 2-methoxyphenyl thiophene as an off white foam (187.0 mg, 0.7074 mmol, 84%). NMR indicated pure product.

¹H NMR (500 MHz, Chloroform-d) δ 7.40 (dd, J=7.5, 1.7 Hz, 1H), 7.34-7.29 (m, 1H), 7.28-7.25 (m, 1H), 7.02-6.95 (m, 2H), 6.70 (d, J=3.4 Hz, 1H), 5.14 (s, 2H), 3.81 (s, 3H), 3.70 (q, J=7.1 Hz, 2H), 1.23 (t, J=7.1 Hz, 3H). ¹³C NMR (126 MHz, Chloroform-d) δ 156.99, 153.33, 131.14, 130.19, 128.69, 123.75, 122.93, 120.29, 111.01, 101.03, 94.83, 64.04, 55.52, 15.10.

Example 10: Synthesis of Precursor to Ligand 3—Step 5b FIG. 1

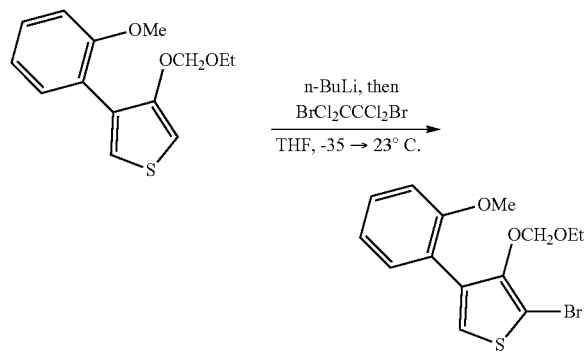

The thiophene was azeotropically dried using PhMe (4×10 mL) prior to use. A clear colorless solution of the thiophene (187.0 mg, 0.7074 mmol, 1.00 eq) in deoxygenated anhydrous THF (10 mL) in a nitrogen filled glovebox was placed in a freezer cooled to −35° C. for 12 hrs upon which a precooled solution of n-BuLi (0.42 mL, 1.061 mmol, 1.50 eq, titrated 2.50 M in hexanes) was added via syringe in a dropwise manner. The now golden yellow-orange solution was allowed to sit in the freezer for 3 hrs upon which it was removed and while stirring (500 rpm), solid 1,2-dibromotetrachloroethane (392.0 mg, 1.203 mmol, 1.70 eq) was added in a quick dropwise manner. After stirring for 2 hrs at 23° C. the now pale yellow heterogeneous mixture was removed from the glovebox, neutralized with aqueous phosphate buffer (20 mL, pH=8, 0.05 M), diluted with CH₂Cl₂ (20 mL) and brine (20 mL), poured into a separatory funnel, partitioned, organics were washed with a saturated aqueous mixture of phosphate buffer (pH=8, 0.05 M) and brine (2×30 mL, 1:1), residual organics were extracted from the aqueous layer using CH₂Cl₂ (2×10 mL), combined, dried over solid Na₂SO₄, decanted, concentrated onto celite, and purified via silica gel chromatography; 10%-50% CH₂Cl₂ in hexanes to afford the bromothiophene as a pale yellow oil (209.9 mg, 0.6115 mmol, 86%). NMR indicated pure product.

¹H NMR (500 MHz, Chloroform-d) δ 7.36 (dd, J=7.5, 1.8 Hz, 1H), 7.32 (td, J=7.7, 1.8 Hz, 1H), 7.24 (s, 1H), 7.01-6.97 (m, 1H), 6.95 (d, J=8.3 Hz, 1H), 4.86 (s, 2H), 3.81 (s, 3H), 3.49 (q, J=7.1 Hz, 2H), 1.01 (t, J=7.1 Hz, 3H). ¹³C NMR (126 MHz, Chloroform-d) δ 156.95, 151.22, 132.54, 131.00, 129.22, 123.47, 122.90, 120.46, 111.04, 98.98, 97.09, 65.12, 55.65, 14.81.

Example 11: Synthesis of Precursor to Ligand 3—Step 6b FIG. 1

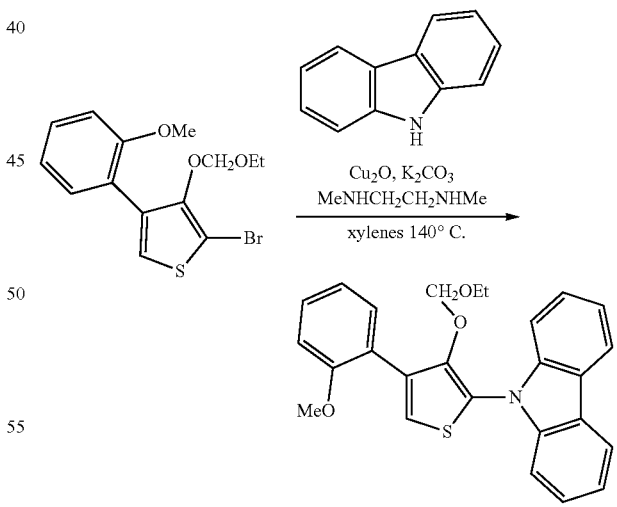

The thiophene was azeotropically dried using PhMe (4×10 mL) prior to use. A solid mixture of the thiophene (179.0 mg, 0.5217 mmol, 1.00 eq), carbazole (192.0 mg, 1.148 mmol, 2.20 eq), Cu₂O (149.0 mg, 1.043 mmol, 2.00 eq), and K₂CO₃ (721.0 mg, 5.217 mmol, 10.0 eq) in an oven-dried vial equipped with a stirbar was evacuated, then back-filled with nitrogen, this process was repeated 4× more, upon which deoxygenated anhydrous xylenes (5.0 mL) was added followed by neat N,N'-dimethylethylenediamine (0.23 mL, 2.087 mmol, 4.00 eq) added via syringe. The vial was sealed with a PTFE cap under a purging flow of nitrogen and placed in a mantle heated to 140° C. After stirring vigorously (1000 rpm) for 72 hrs, the dark red mixture was removed from the mantle, allowed to cool gradually to 23° C., diluted with $CH_2Cl_2$ (20 mL), suction filtered over silica gel using $CH_2Cl_2$ as the eluent, the golden orange filtrate was concentrated onto celite, and purified via silica gel chromatography; 10%-50% $CH_2Cl_2$ in hexanes and then purified again using 25%-40% $CH_2Cl_2$ in hexanes to afford the carbazoyl-thiophene as an off white solid (50.0 mg, 0.1164 mmol, 22%). NMR indicated pure product.

$^1$H NMR (500 MHz, Chloroform-d) δ 8.11 (dt, J=7.7, 0.9 Hz, 2H), 7.57 (dd, J=7.6, 1.8 Hz, 1H), 7.49 (dtd, J=15.1, 8.2, 1.1 Hz, 4H), 7.39 (s, 1H), 7.38-7.34 (m, 1H), 7.32 (ddd, J=7.8, 6.9, 1.2 Hz, 2H), 7.05 (td, J=7.5, 1.0 Hz, 1H), 7.02 (d, J=8.3 Hz, 1H), 4.50 (s, 2H), 3.91 (s, 3H), 2.80 (q, J=7.1 Hz, 2H), 0.51 (t, J=7.1 Hz, 3H). $^{13}$C NMR (126 MHz, Chloroform-d) δ 157.08, 148.97, 141.84, 131.85, 130.97, 129.09, 126.24, 123.80, 123.51, 121.84, 120.70, 120.51, 120.48, 120.08, 111.17, 110.71, 96.76, 64.43, 55.77, 14.10.

Example 12: Synthesis of Ligand 3—Step 7b FIG. 1

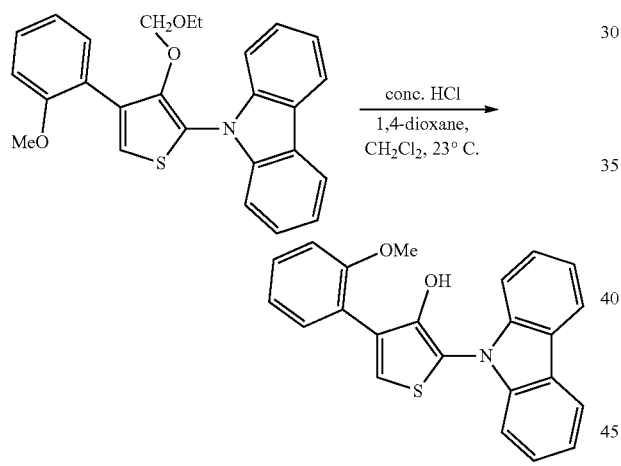

To a solution of the thiophene ((50.0 mg, 0.1164 mmol, 1.00 eq) in $CH_2Cl_2$ (3 mL) and 1,4-dioxane (3 mL) under nitrogen was added conc. HCl (3 mL). The clear dark golden yellow solution was stirred (500 rpm) for 24 hrs, diluted with 1 N HCl (25 mL) and $CH_2Cl_2$ (25 mL), poured into a separatory funnel, partitioned, organics were washed with 1 N HCl (2×10 mL), residual organics were extracted from the aqueous layer using $CH_2Cl_2$ (1×10 mL), combined, dried over solid $Na_2SO_4$, decanted, concentrated onto celite, and purified via silica gel chromatography; 15%-75% $CH_2Cl_2$ in hexanes to afford the hydroxy-thiophene, L-3, as a white foam (42.5 mg, 0.1144 mmol, 98%). NMR indicated pure product.

$^1$H NMR (500 MHz, Chloroform-d) δ 8.13 (d, J=7.8 Hz, 2H), 7.58 (dt, J=7.6, 1.9 Hz, 1H), 7.46 (d, J=3.9 Hz, 4H), 7.42 (td, J=7.8, 1.8 Hz, 1H), 7.35-7.28 (m, 3H), 7.17 (td, J=7.5, 1.1 Hz, 1H), 7.09-7.04 (m, 1H), 6.86 (s, 1H), 3.95 (s, 3H). $^{13}$C NMR (126 MHz, Chloroform-d) δ 154.86, 147.89, 141.87, 131.43, 130.78, 129.56, 126.06, 124.11, 123.62, 122.57, 120.34, 120.20, 119.32, 115.38, 112.07, 110.57, 56.46.

Example 13: Synthesis of Procatalyst 6

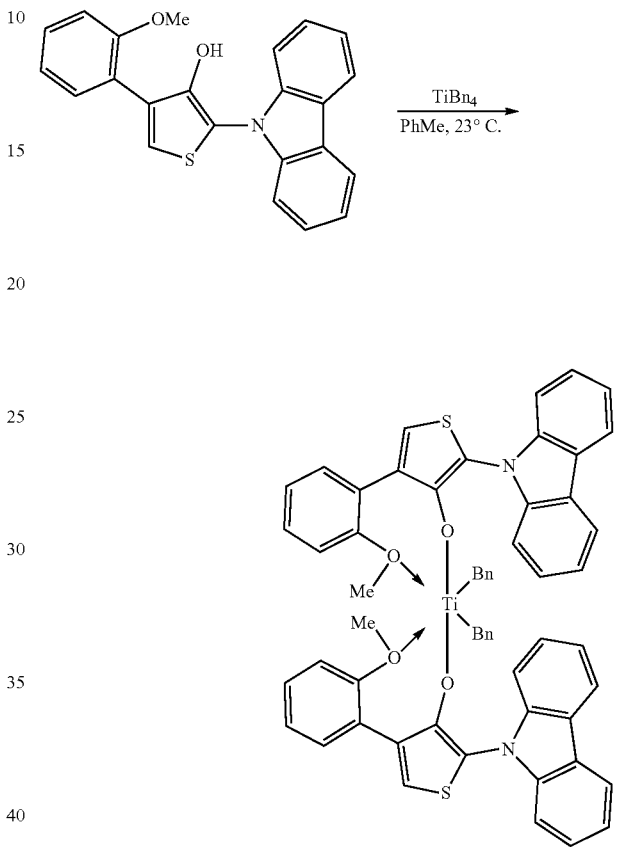

The thiophene ligand, L-3, was azeotropically dried using PhMe (4×10 mL) prior to use. To a solution of the thiophene (15.6 mg, 0.0420 mmol, 2.00 eq) in PhMe (4 mL) in a nitrogen filled glovebox at 23° C. was added a solution of $TiBn_4$ (9.1 mg, 0.0221 mmol, 1.00 eq) in PhMe (0.36 mL) in a dropwise manner. After stirring (500 rpm) for 1 hr the dark crimson red mixture was filtered using a 0.45 m PTFE submicron filter, rinsed with anhydrous deoxygenated PhMe (3×3 mL), and concentrated to afford the titanium complex as a red solid (20.6 mg, 0.0212 mmol, 96%). NMR indicated product which contains trace amounts of the minor isomers.

$^1$H NMR (500 MHz, Benzene-$d_6$) δ 7.89 (dt, J=7.7, 1.0 Hz, 4H), 7.55 (dt, J=8.2, 0.9 Hz, 4H), 7.27 (ddd, J=8.3, 7.2, 1.2 Hz, 4H), 7.15-7.09 (m, 4H), 6.96 (s, 2H), 6.87 (ddd, J=8.3, 7.4, 1.8 Hz, 2H), 6.74-6.67 (m, 4H), 6.65-6.59 (m, 2H), 6.53 (td, J=7.5, 1.1 Hz, 2H), 6.22 (dd, J=7.6, 1.7 Hz, 4H), 6.10-6.06 (m, 4H), 3.05 (s, 6H), 1.36 (s, 4H). $^{13}$C NMR (126 MHz, Benzene-$d_6$) δ 156.90, 156.54, 142.97, 142.08, 130.85, 130.44, 128.90, 128.07, 126.26, 123.83, 123.71, 123.47, 121.33, 120.50, 120.30, 119.77, 116.33, 111.98, 111.03, 95.84, 55.46.

Example 14: Synthesis of 3-Bromo-2-OCH$_2$OEt-Thiopene Precursor—3-Bromo-2-OCH$_2$OEt-Thiopene is a Reagent in Step 6a in FIG. 1

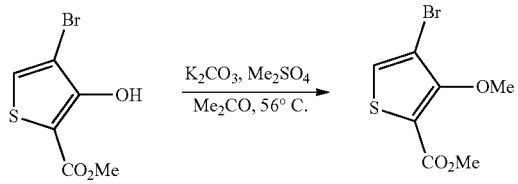 [SMILES: COC(=O)c1scc(Br)c1O ; COC(=O)c1scc(Br)c1OC]

A pale purple heterogeneous mixture of the hydroxyl-thiophene (1.000 g, 4.218 mmol, 1.00 eq), K$_2$CO$_3$ (1.749 g, 12.654 mmol, 3.00 eq), and Me$_2$SO$_4$ (0.42 mL, 4.429 mmol, 1.05 eq) in acetone (40 mL) equipped with a reflux condenser under nitrogen was placed in a mantle heated to 60° C. After stirring (500 rpm) for 4 hrs TLC of the mixture indicated full consumption of SM, the heterogeneous mixture was removed from the heating mantle, allowed to cool gradually to 23° C., diluted with CH$_2$Cl$_2$ (50 mL), stirred vigorously (1000 rpm) for 2 minutes, suction filtered through a pad of celite, and the pale purple filtrate was concentrated to afford the ether as a white solid (1.029 g, 4.098 mmol, 97%). NMR indicated pure product.

$^1$H NMR (500 MHz, Chloroform-d) δ 7.38 (d, J=1.4 Hz, 1H), 4.01 (d, J=1.5 Hz, 3H), 3.88 (d, J=1.4 Hz, 3H). $^{13}$C NMR (126 MHz, Chloroform-d) δ 160.68, 158.65, 127.02, 116.76, 108.42, 62.49, 52.17.

Example 15: Synthesis of 3-Br-2-OCH$_2$OEt-Thiopene Precursor—3-Bromo-2-OCH$_2$OEt-Thiopene is a Reagent in Step 6a in FIG. 1

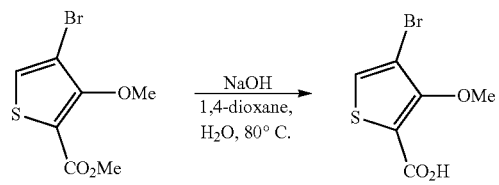 [SMILES: COC(=O)c1scc(Br)c1OC ; "NaOH" ; COc1c(Br)csc1C(=O)O]

To a mixture of the ester (1.005 g, 4.002 mmol, 1.00 eq, product of Example 14) in 1,4-dioxane/H$_2$O (50 mL, 1:1) was added solid NaOH (3.200 g, 80.040 mmol, 20.00 eq). The heterogeneous mixture was equipped with a reflux condenser under nitrogen, placed in a mantle heated to 80° C., stirred (500 rpm) for 4 hrs upon which TLC indicated complete consumption of starting material, the resultant pale yellow solution was removed from the heating mantle, allowed to cool gradually to 23° C., placed in an ice water bath for 20 mins, acidified to pH=2 using aqueous HCl (1 N), the resultant white heterogeneous mixture was diluted with CH$_2$Cl$_2$ (25 mL), the now biphasic mixture was poured into a separatory funnel, partitioned, organics were washed with aqueous HCl (2×25 mL, 1 N), residual organics were extracted from the aqueous layer using CH$_2$Cl$_2$ (2×20 mL), combined, dried over solid Na$_2$SO$_4$, decanted, and concentrated to afford the acid as a white solid (0.865 g, 3.649 mmol, 91%). NMR indicated pure product.

$^1$H NMR (500 MHz, Acetone-d$_6$) δ 12.0-10.75 (br s, 1H), 7.82 (d, J=1.4 Hz, 1H), 4.00 (d, J=1.4 Hz, 4H). $^{13}$C NMR (126 MHz, Acetone-d$_6$) δ 160.35, 127.71, 117.26, 107.71, 97.58, 61.79.

Example 16: Synthesis of 3-Br-2-OCH$_2$OEt-Thiopene—a Reagent in 6a in FIG. 1

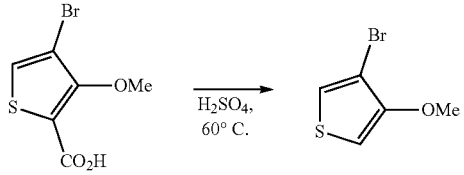

A black solution of the thiophene (0.815 g, 3.438 mmol, 1.00 eq, product of Example 15) in concentrated H$_2$SO$_4$ (10 mL) under nitrogen was placed in a mantle heated to 60° C. After stirring (500 rpm) for 4 hrs TLC indicated complete consumption of the starting carboxylic acid. The black mixture was removed from the heating mantle, allowed to cool to 23° C., placed in an ice water bath for 30 mins, slowly diluted with ice water in a dropwise manner and then with Et$_2$O (20 mL), the biphasic black mixture was suction filtered over celite, washed with Et$_2$O (4×20 mL), the biphasic filtrate was poured into a separatory funnel, partitioned, organics were washed with water (2×20 mL), residual organics were extracted from the aqueous layer using Et$_2$O (2×20 mL), combined, dried over solid Na$_2$SO$_4$, decanted, carefully concentrated (Note: Product is volatile), the resultant black oil was suspended in CH$_2$Cl$_2$, purified via suction filtration through a pad of silica gel using CH$_2$Cl$_2$, and concentrated to afford a clear pale orange oil (0.483 g, 2.502 mmol, 73%). NMR indicated product with trace impurities which was used in the subsequent reaction without purification.

$^1$H NMR (500 MHz, Chloroform-d) δ 7.19 (d, J=3.5 Hz, 1H), 6.24 (d, J=3.4 Hz, 1H), 3.87 (s, 3H). $^{13}$C NMR (126 MHz, Chloroform-d) δ 154.50, 122.27, 102.81, 96.72, 57.96.

Example 17: Synthesis of a Precursor to Ligand 2—Step 6a in FIG. 1

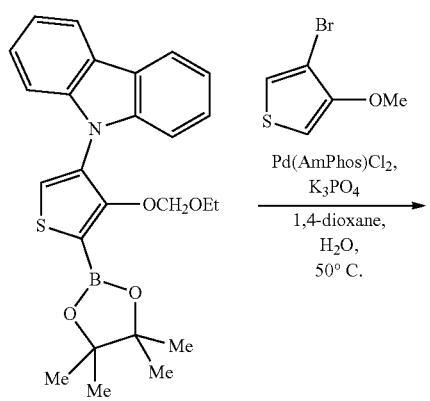

-continued

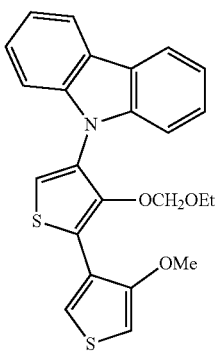

A mixture of Pd(AmPhos)Cl$_2$ (14.3 mg, 0.0202 mmol, 0.10 eq), thiophene boropinacolate ester (100.0 mg, 0.2225 mmol, 1.10 eq, product of Example 4), and K$_3$PO$_4$ (156.0 mg, 0.7344 mmol, 3.30 eq) in a vial equipped with a stirbar was evacuated, then back-filled with nitrogen, this evacuation/back-fill process was conducted 4× more, then freshly deoxygenated solution of the bromothiophene ether (39.0 mg, 0.2023 mmol, 1.00 eq) in 1,4-dioxane (4.8 mL) was added followed by the addition of freshly deoxygenated water (0.48 mL), the vial was sealed with PTFE cap under a positive flow of N$_2$, placed in a mantle heated to 50° C., the magenta solution was stirred (500 rpm) for 24 hrs, removed from the mantle, the now dark purple solution was allowed to cool to 23° C., diluted with CH$_2$Cl$_2$ (10 mL), suction filtered over a pad of silica gel, rinsed with CH$_2$Cl$_2$ (4×20 mL), and the resultant filtrate was concentrated, residual 1,4-dioxane was azeotropically removed using PhMe (4×5 mL), the resultant dark purple foam was dissolved in CH$_2$Cl$_2$ (10 mL), concentrated onto celite, and purified via silica gel chromatography; 10%-100% CH$_2$Cl$_2$ in hexanes and then purified a second time using 10% CH$_2$Cl$_2$ in hexanes—50% CH$_2$Cl$_2$ in hexanes to afford the biscoupled thiophene as a pale golden brown amorphous foam (45.0 mg, 0.1033 mmol, 51%) as well as the protected ligand of Procatalysts 34 and 35 as an off-white foam (20.1 mg, 0.0381 mmol, 38%) which is deprotected using concentrated HCl in a solution of CH$_2$Cl$_2$ and 1,4-dioxane at 23° C. NMR indicated product along with minor impurities as well as residual hexanes and CH$_2$Cl$_2$. The material was used in the subsequent deprotection without further purification.

$^1$H NMR (400 MHz, Chloroform-d) δ 8.11 (dt, J=7.8, 1.0 Hz, 2H), 7.92 (d, J=3.4 Hz, 1H), 7.46-7.39 (m, 4H), 7.32 (s, 1H), 7.28 (ddd, J=8.0, 6.2, 2.0 Hz, 2H), 6.34 (d, J=3.4 Hz, 1H), 4.47 (s, 2H), 3.97 (s, 3H), 2.86 (q, J=7.0 Hz, 2H), 0.58 (t, J=7.0 Hz, 3H). $^{13}$C NMR (101 MHz, Chloroform-d) δ 155.53, 147.03, 140.87, 128.88, 126.04, 123.42, 123.15, 122.52, 121.54, 120.07, 120.01, 118.70, 110.41, 96.87, 96.56, 65.11, 57.74, 14.25.

Example 18: Synthesis of Ligand 2—FIG. 1

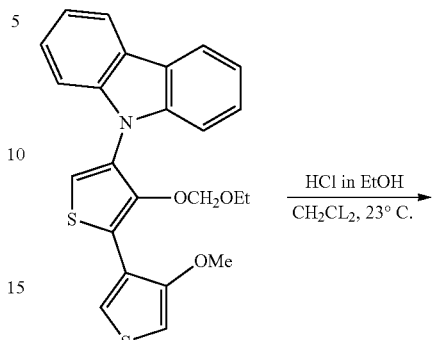

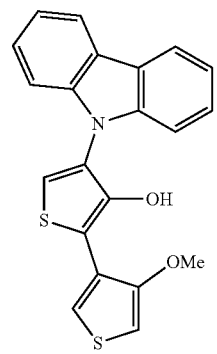

To a solution of the thiophene-ether (45.0 mg, 0.1033 mmol, 1.00 eq; product of Example 17) in CH$_2$Cl$_2$ (2 mL) was added HCl in EtOH (2 mL, non-titrated 1.25 M). The now golden yellow solution was stirred (300 rpm) for 24 hrs under nitrogen, diluted with aqueous HCl (10 mL, 1 N) and CH$_2$Cl$_2$ (10 mL), poured into a separatory funnel, partitioned, organics were washed with aqueous HCl (2×20 mL, 1 N), residual organics were extracted from the aqueous layer using CH$_2$Cl$_2$ (2×10 mL), combined, dried over solid Na$_2$SO$_4$, decanted, concentrated onto celite, and purified via silica gel chromatography using an ISCO chromatography purification system; 10% CH$_2$Cl$_2$-50% CH$_2$Cl$_2$ in hexanes to afford the hydroxyl thiophene Ligand 2 (30.7 mg, 0.0813 mmol, 79%) as a white amorphous foam. NMR indicated pure product.

$^1$H NMR (400 MHz, Chloroform-d) δ 8.12 (d, J=7.7 Hz, 2H), 7.69 (s, 1H), 7.46-7.34 (m, 4H), 7.34-7.21 (m, 4H), 6.44 (d, J=3.4 Hz, 1H), 3.94 (s, 3H). $^1$H NMR (500 MHz, Benzene-d$_6$) δ 8.00 (dq, J=7.6, 1.0 Hz, 2H), 7.33-7.26 (m, 4H), 7.22-7.17 (m, 2H), 7.11 (h, J=1.5 Hz, 2H), 7.09 (dd, J=3.5, 1.1 Hz, 1H), 6.63 (t, J=1.3 Hz, 1H), 5.55 (dt, J=2.9, 1.5 Hz, 1H), 2.85 (d, J=1.1 Hz, 4H). $^{13}$C NMR (101 MHz, Chloroform-d) δ 153.52, 145.51, 141.03, 126.97, 125.91, 125.27, 123.25, 120.47, 120.21, 119.98, 119.37, 111.67, 110.27, 99.05, 53.41.

Example 19: Synthesis of Procatalyst 9

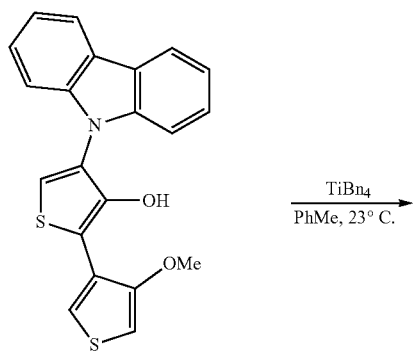

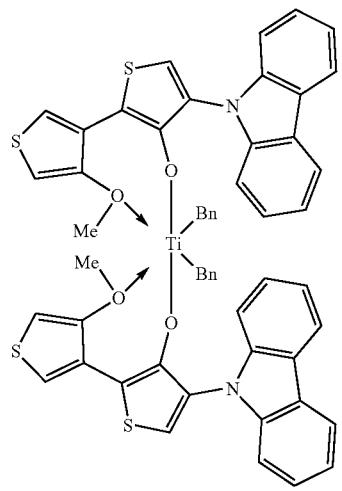

The thiophene ligand, L-2, was azeotropically dried using PhMe (4×10 mL) prior to use. To a solution of the thiophene (25.5 mg, 0.0676 mmol, 2.00 eq) in PhMe (3 mL) in a nitrogen filled glovebox at 23° C. was added a solution of TiBn$_4$ (13.9 mg, 0.0338 mmol, 1.00 eq) in PhMe (0.28 mL) in a dropwise manner. After stirring (500 rpm) for 1 hr the dark crimson red mixture was filtered using a 0.45 am PTFE submicron filter, rinsed with anhydrous deoxygenated PhMe (3×3 mL), and concentrated to afford the titanium complex as a red solid (32.3 mg, 0.0329 mmol, 99%). NMR indicated the product, which exists as a complex mixture of isomers.

Example 20: Polymers Yielded from Procatalysts

Catalyst activity (in terms of quench time and polymer yield) and resulting polymer characteristics were assessed for Procatalysts 1-9. The polymerization reactions were carried out in a parallel polymerization reactor (PPR).

The olefin polymerization reactions were carried out initially in a parallel polymerization reactor (PPR) using either isolated metal complexes (See experimental examples) or in situ generated complexes (Ligand (L-1 to L-14) and ZrBn$_4$ or HfBn$_4$ in a 1:1 or 2:1 mixture prepared 30 mins before the polymerization experiments), and then in a 2-L semi-batch reactor. (Procatalysts 2, 4-5, 7-8 were generated in situ.) The activator was [HNMe(C$_{18}$H$_{37}$)$_2$][B(C$_6$F$_5$)$_4$] in amounts of 1.5 molar equivalents. The data in Table 1 was obtained at 120° C. using ethylene pressures of 150 or 213 psi and 1-octene. The molar ratio of 1-octene and ethylene was 2.24:1. The quench times were measured based on the time at which the reaction reached 50 or 75 psi ethylene uptake or after 1800 seconds, whichever is first, and then the polymerizations were quenched with CO to destroy the catalyst and end the experiment.

TABLE 1

Polymerization Data from PPR Experiments

| Procatalyst No. | Procatalyst nmoles | Temp. (° C.) | Quench Time (s) | Polymer Yield (mg) | Mw (g/mol) | PDI | Mol % Octene |
|---|---|---|---|---|---|---|---|
| MC-1 | 100 | 120 | 791 | 89 | 114,057 | 24.2 | 5.8 |
| MC-2 | 100 | 120 | 1,800 | 49 | 137,173 | 90.7 | 6.4 |
| MC-3 | 100 | 120 | 1,801 | 54 | 45,210 | 6.8 | 16.6 |
| MC-4 | 100 | 120 | 387 | 122 | 57,856 | 10.2 | 6.1 |
| MC-5 | 100 | 120 | 1,801 | 28 | 42,780 | 33.8 | 7.7 |
| MC-6 | 100 | 120 | 1,801 | 57 | 26,233 | 4.6 | 16.1 |
| MC-7 | 100 | 120 | 1,635 | 70 | 220,106 | 40.0 | 5.0 |
| MC-8 | 100 | 120 | 1,801 | 45 | 79,852 | 18.3 | 10.5 |
| MC-9 | 100 | 120 | 1,801 | 9 | N.D. | N.D. | N.D. |
| Zr(Bn)$_4$ | 100 | 120 | 1,802 | 74 | 372,812 | 105.1 | 3.4 |
| Zr(Bn)$_4$ | 100 | 120 | 1,801 | 75 | 269,001 | 70.7 | 8.2 |

*Mol % Octene or C8/olefin is defined as: (moles 1-octene/(total moles 1-octene and ethylene)) × 100.

The invention claimed is:

1. A catalyst system comprising a metal-ligand complex according to formula (I):

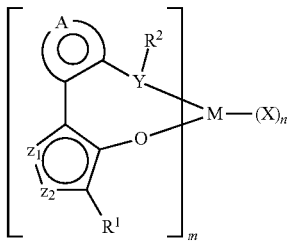

where
- M is a metal chosen from titanium, zirconium, or hafnium, the metal having a formal oxidation state of +2, +3, or +4;
- each X is a monodentate or bidentate ligand independently chosen from unsaturated $(C_2-C_{50})$hydrocarbon, unsaturated $(C_2-C_{50})$heterohydrocarbon, $(C_1-C_{50})$hydrocarbyl, $(C_6-C_{50})$aryl, $(C_4-C_{50})$heteroaryl, cyclopentadienyl, substituted cyclopentadienyl, $(C_4-C_{12})$diene, halogen, —N$(R^N)_2$, or —NCOR$^C$;
- n is 1, 2, or 3;
- m is 1 or 2;
- the metal-ligand complex has 6 or fewer metal-ligand bonds;
- each Y is independently selected from oxygen or sulfur;
- each $R^1$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, —P(O)$(R^P)_2$, $R^C$S(O)$_2$—, $(R^C)_2$C=N—, $R^C$C(O)O—, $R^C$OC(O)—, $R^C$C(O)N(R)—, $(R^C)_2$NC(O)—, halogen, and —H;
- each $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, —Si$(R^C)_3$, and or —Ge$(R^C)_3$;
- for each individual ring containing groups $z_1$ and $z_2$, each of $z_1$ and $z_2$ is independently selected from the group consisting of sulfur, oxygen, —N$(R^R)$—, =N—, and —C$(R^R)$—, provided that at least one of $z_1$ or $z_2$ is —C$(R^R)$—;
- each A is independently chosen from -$z_3$-$z_4$-$z_5$- or —C$(R^3)$C$(R^4)$C$(R^5)$C$(R^6)$—, where:
  - each of $z_3$, $z_4$, and $z_5$ is selected from the group consisting of sulfur, oxygen, —N$(R^R)$—, and —C$(R^R)$—, provided that exactly one of $z_3$, $z_4$, or $z_5$ is —C$(R^R)$— or that exactly two of $z_3$, $z_4$, or $z_5$ are —C$(R^R)$—; and
  - each $R^3$, $R^4$, $R^5$, and $R^6$ is independently chosen from $(C_1-C_{50})$hydrocarbyl, $(C_1-C_{50})$heterohydrocarbyl, $(C_6-C_{50})$aryl, $(C_4-C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N(R)—, $(R^C)_2$NC(O)—, halogen, or —H;
- each $R^C$, $R^N$, and $R^P$ in formula (I) is independently a $(C_1-C_{50})$hydrocarbyl; and
- each $R^R$ is independently chosen from $(C_1-C_{50})$hydrocarbyl, $(C_1-C_{50})$heterohydrocarbyl, $(C_6-C_{50})$aryl, $(C_4-C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N(R)—, $(R^C)_2$NC(O)—, halogen, or —H, wherein any two $R^R$ groups bonded to neighboring atoms are optionally linked.

2. The catalyst system according to claim 1, wherein:
- M is zirconium or hafnium;
- each X is independently chosen from $(C_6-C_{20})$aryl, $(C_4-C_{20})$heteroaryl, $(C_4-C_{12})$diene, or a halogen;
- each Y is oxygen; and
- each $R^1$ is independently chosen from $(C_6-C_{50})$aryl or $(C_4-C_{50})$heteroaryl.

3. The catalyst system according to claim 1, wherein for each individual ring containing groups $z_1$ and $z_2$, one of $z_1$ and $z_2$ is sulfur, and the other is C(H).

4. The catalyst system according to claim 1, wherein each A is —C$(R^3)$C$(R^4)$C$(R^5)$C$(R^6)$— each $R^3$, $R^4$, $R^5$, and $R^6$ is —H.

5. The catalyst system according to claim 1, wherein each $R^1$ is carbazolyl and each $R^2$ is methyl.

6. The catalyst system according to claim 1, wherein each $R^1$ is phenyl or a substituted phenyl.

7. The catalyst system according to claim 1, wherein m is 2 and the metal-ligand complex has a structure according to formula (II):

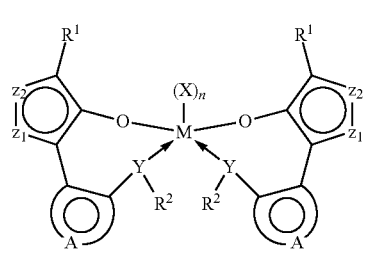

where $R^1$, $R^2$, $z_1$, $z_2$, A, Y, and X are as defined in formula (I); and n is 1 or 2.

8. The catalyst system according to claim 7, wherein:
- M is zirconium or hafnium;
- each X is independently chosen from $(C_6-C_{50})$aryl, $(C_6-C_{50})$heteroaryl, $(C_4-C_{12})$diene, or halogen;
- each Y is oxygen;
- each $R^1$ and $R^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, halogen, and hydrogen.

9. The catalyst system according to claim 7, wherein for each individual ring containing groups $z_1$ and $z_2$, one of $z_1$ and $z_2$ is sulfur, and the other is —C(H)—.

10. The catalyst system according to claim 7, wherein each $R^1$ is carbazolyl and each $R^2$ is methyl.

11. The catalyst system according to claim 7, wherein each $R^1$ is independently 3,6-di-tert-butylcarbazol-9-yl or 2,7-di-tert-butylcarbazol-9-yl.

12. The catalyst system according to claim 7, wherein each $R^1$ is 3,5-di-tert-butylphenyl.

13. The catalyst system according to claim 7, wherein each $R^1$ is 2,4,6-trimethylphenyl.

14. A polymerization process for producing an ethylene-based polymer, the polymerization process comprising:
polymerizing ethylene and at least one additional α-olefin in the presence of a catalyst system according to claim 1 and at least one activator to form a polymer.

15. A polymerization process for producing a propylene-based polymer, the polymerization process comprising:

polymerizing propylene with or without an additional α-olefin in the presence of a catalyst system according to claim 1 and at least one activator to form a polymer.

16. The polymerization process according claim 15, wherein the activator comprises MMAO, bis(hydrogenated tallow alkyl)methylammonium, tetrakis(pentafluorophenyl) borate, or tris(pentafluorophenyl)borane.

\* \* \* \* \*